US012497911B2

(12) United States Patent
Bostick et al.

(10) Patent No.: US 12,497,911 B2
(45) Date of Patent: Dec. 16, 2025

(54) SYSTEM AND METHOD FOR THERMAL ENERGY STORAGE

(71) Applicant: NOOTER/ERIKSEN, INC., Fenton, MO (US)

(72) Inventors: Glen L. Bostick, Colubmia, IL (US); Piero Scapini, Milan (IT); David L. Wait, Port Ludlow, WA (US)

(73) Assignee: Nooter/Eriksen, Inc., Fenton, MO (US)

( * ) Notice: Subject to any disclaimer, the term of this patent is extended or adjusted under 35 U.S.C. 154(b) by 0 days.

(21) Appl. No.: 18/713,099

(22) PCT Filed: May 11, 2022

(86) PCT No.: PCT/US2022/028692
§ 371 (c)(1),
(2) Date: May 23, 2024

(87) PCT Pub. No.: WO2023/219610
PCT Pub. Date: Nov. 16, 2023

(65) Prior Publication Data
US 2024/0418106 A1    Dec. 19, 2024

(51) Int. Cl.
| F01K 3/14 | (2006.01) |
| F01K 3/18 | (2006.01) |
| F01K 23/10 | (2006.01) |

(52) U.S. Cl.
CPC .............. *F01K 23/101* (2013.01); *F01K 3/14* (2013.01); *F01K 3/186* (2013.01)

(58) Field of Classification Search
CPC ......... Y02E 60/14; Y02E 70/30; F28D 13/00; F28D 20/0056; F01K 3/00; F01K 3/12
See application file for complete search history.

(56) References Cited

U.S. PATENT DOCUMENTS

| 3,242,974 A * | 3/1966 | Goulounes .............. A23L 3/165 34/562 |
| 2016/0200572 A1 | 7/2016 | Xie |
| 2020/0161934 A1 | 5/2020 | Ramamurthy et al. |
| 2024/0353183 A1* | 10/2024 | Magaldi ................ F28D 20/021 |

FOREIGN PATENT DOCUMENTS

| CN | 113432469 A * | 9/2021 |
| NZ | 585425 A | 5/2010 |
| RU | 2659911 C1 | 7/2018 |

OTHER PUBLICATIONS

International Search Report and Written Opinion PCT/US2022/028692 Date of mailing Aug. 9, 2022 (Aug. 9, 2022).
International Preliminary Report on Patentability PCT/US2022/028692 Date of mailing Nov. 22, 2023 (Nov. 22, 2023).

* cited by examiner

*Primary Examiner* — Eric S Ruppert
(74) *Attorney, Agent, or Firm* — Sandberg Phoenix & von Gontard, P.C.

(57) ABSTRACT

A system and method for efficiency and revitalization of power plant assets allows for existing fossil fuel burning power plants to operate in tandem with renewable power sources and to operate at a consistent base load. The system and method reduce fossil fuel burning power plant power/load cycling and improve efficiency, increase power plant useful lifetime, and reduce emissions. The system and method allow for substantially consistent power output regardless of power demand and power supply generation from existing fossil fuel burning power plants and renewable energy sources supplying a common grid.

34 Claims, 7 Drawing Sheets

SYSTEM AND METHOD FOR THERMAL ENERGY STORAGE

RELATED APPLICATIONS

This application hereby incorporates by reference, in their entireties, U.S. Pat. Nos. 6,508,206; 10,180,086 and 10,634,339.

STATEMENT REGARDING FEDERALLY SPONSORED RESEARCH OR DEVELOPMENT

Not Applicable.

BACKGROUND ART

A consequence of the success of solar power plants (and other renewable energy sources) establishing a meaningful role in recent electrical power production is that fuel burning power plant assets may be subject to less desirable operating conditions. For example, during the day when a fuel burning power plant and a solar energy power plant are providing electric power to a geographic region and elevated amounts of solar power are available, the geographical region may experience an excess of power production beyond that which is required by the consumers of the geographic region unless power plant operators are able to remove power generation from other sources. Similarly, an excess of power production can occur due to variability in power production from other renewable power sources including, for example, wind power, hydroelectric power, and the like.

Understanding that solar power sources, or other renewable power sources, have the lowest operating cost, the result is often that other power producing plants, which are often fossil fuel based and can controllably reduce load (i.e., reduce the amount of fuel being burnt), see themselves more, and more, often running at part load operation during the day. Part load operation of a fuel burning power plant results in poor powerplant efficiency and typically an increase in the emission output on a per kw basis, both undesirable consequences.

Many existing fossil fuel burning power plants were not designed for cyclic operation or part load operation during the day and full load operation at night. A daily increase/decrease cycle of plant load can lead to premature failure of components of the plant leading to increased maintenance costs for the plant and lower plant availability.

What is needed are systems and methods to allow for existing fossil fuel burning power plants to operate in tandem with renewable power sources and to operate the fuel burning power plants at a consistent base load. Such systems and methods are needed to reduce fossil fuel burning power plant power/load cycling to improve efficiency, increase power plant useful lifetime, and reduce emissions. Such systems and methods should allow for substantially consistent power output regardless of power demand and power supply generation from existing fossil fuel burning power plants and renewable energy sources supplying a common grid.

BRIEF DESCRIPTION OF THE DRAWINGS

Corresponding reference numerals will be used throughout the several figures of the drawings.

DETAILED DESCRIPTION OF DISCLOSURE

The following detailed description illustrates the claimed subject matter by way of example and not by way of limitation. This description will clearly enable one skilled in the art to make and use the claimed disclosure, and describes several embodiments, adaptations, variations, alternatives and uses of the claimed disclosure, including what is presently believed to be the best mode of carrying out the disclosure. Additionally, it is to be understood that the claimed invention is not limited in its application to the details of construction and the arrangements of components set forth in the following description or illustrated in the drawings. The claimed disclosure is capable of other embodiments and of being practiced or being carried out in various ways. Also, it is to be understood that the phraseology and terminology used herein is for the purpose of description and should not be regarded as limiting.

Figure 1:
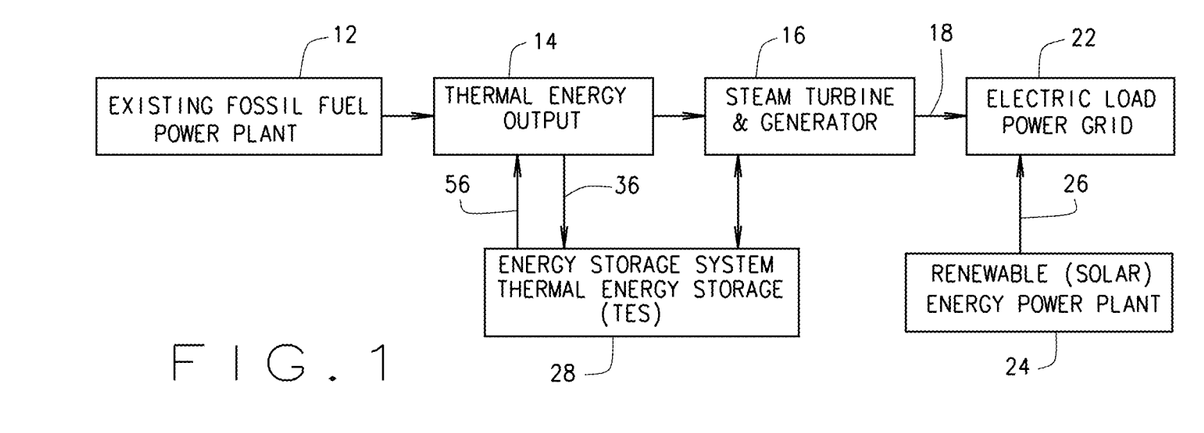
FIG. 1 is a schematic representation of an environment of a system and method for efficiency and revitalization of power plant assets that combines an existing fossil fuel burning power plant with an energy storage system

Referring to FIG. 1, a heat source powerplant 12 is represented schematically. For example, the heat source power plant 12 is a conventional fossil fuel power plant. On operation of the heat source power plant 12, energy in the form of thermal energy or steam 14 is output from the plant. The thermal energy 14 is shown schematically being delivered to a device 16 that converts the heat of the thermal energy 14 to electricity. For example, the thermal energy output 14 from the power plant 12 is delivered to a steam turbine that is operatively connected to a generator 16. Operation of the steam turbine drives the associated generator 16 and produces electricity 18 that is delivered to an electric grid power load 22.

Also represented schematically in FIG. 1 is a renewable energy power plant 24. For example, the renewable energy power plant 24 is a solar power plant. The solar power plant 24 is also represented schematically as producing and delivering electricity 26 to the electric grid power load 22.

The system and method for efficiency and revitalization of power plant assets of this disclosure enables the fossil fuel power plant 12 to operate at a substantially constant base load or steady state operation at design conditions and avoids cyclic operation of the power plant 12. Steady state operation at design conditions of the fossil fuel power plant 12 is achieved by combining an energy storage system or a thermal energy storage (TES) mechanism 28 represented schematically in FIGS. 1 and 2 in combination with the fossil fuel power plant 12.

Figure 2:
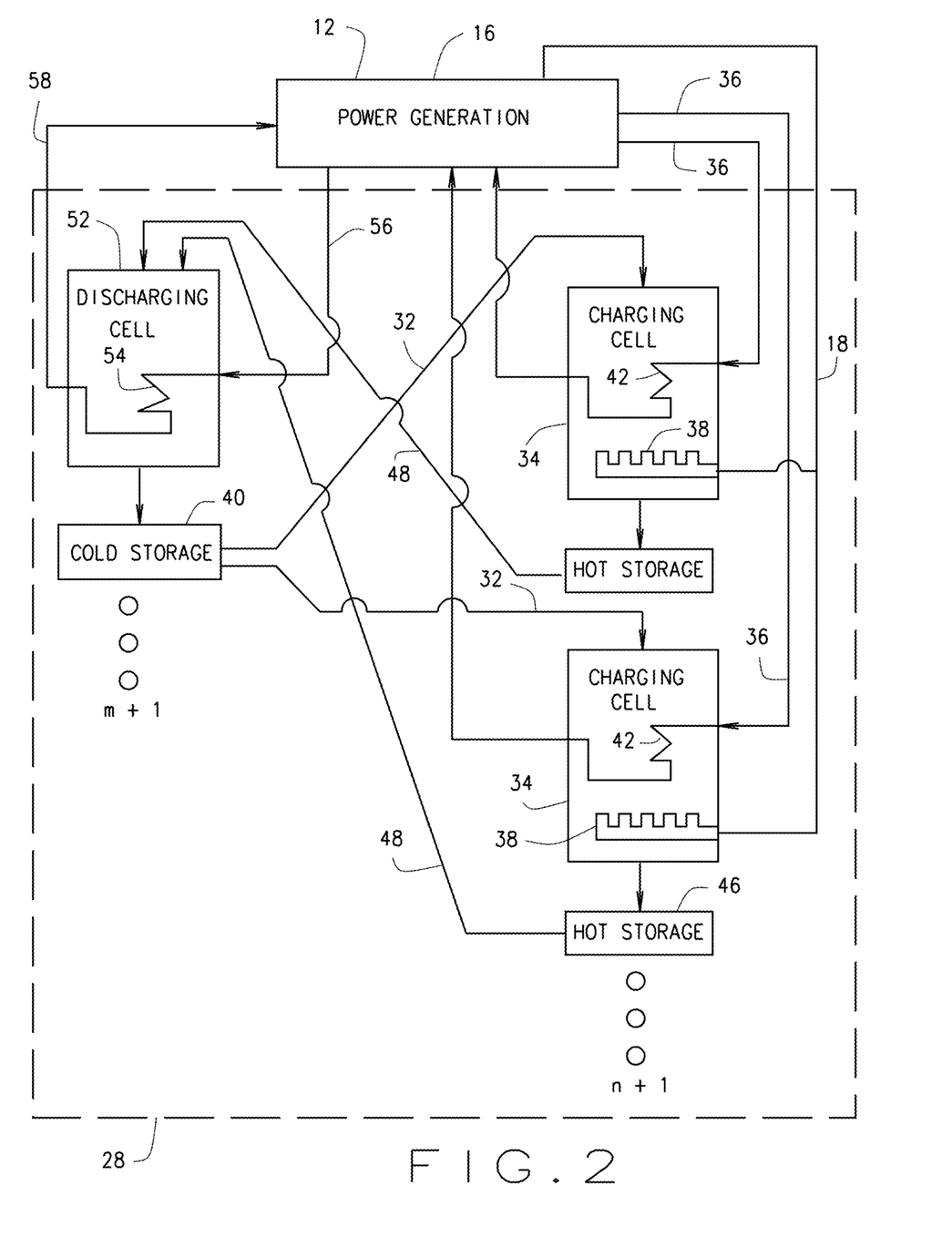
FIG. 2 is a schematic illustrating an embodiment of the disclosure having separate charging and discharging cells arranged as an array of cells.

Although a fossil fuel power plant 12 is represented in FIGS. 1 and 2, the thermal energy storage (TES) mechanism 28 can be employed to provide heat to any process which would benefit. In the preferred embodiment, the thermal energy storage mechanism 28 employs stored heat to generate steam, at various pressures, with the intent that the steam is used to supplement steam in an existing steam turbine 16 allowing for the existing fossil burning power plant 12 to be reduced in load during discharge of the thermal energy storage mechanism 28. The reduction in load of the fossil fuel burning power plant 12 works to reduce emissions and CO2, both of which are attractive to meet environmental targets. Additionally, the proper balance of burned fuel of the power plant 12 and thermal energy discharge of the thermal energy storage mechanism 28 allows for the power plant 12 to reduce plant cycling, which could lead to damage of the equipment of the power plant 12 and shorten the power plant life. The same fossil fuel burning power plant 12 could be used to discharge the thermal energy provided to the plant by the thermal energy storage mechanism 28 during periods when there is a reduced electrical demand (e.g., during daytime when high recyclable energy is available). The thermal energy storage mechanism 28 could be used in combination with a power cycling plant such as a heat recovery steam generator (HRSG) but could also be used in combination with a coal burning power plant or a gas burning power plant or any other equivalent type of power plant.

In addition, while the described environment is using steam as the heating/charging energy source of the thermal energy storage mechanism 28, other energy streams could also be employed for heating, such as electrical resistance heating or waste heat energy from an industrial process. Heating of the thermal energy storage mechanism 28 could also be provided by multiple separate energy sources. Additionally, while the steam/water being heated by the thermal energy storage mechanism 28 is described as for use in an existing steam turbine, the same steam could be used for any applicable industry process. Furthermore, while steam/water is the preferred working fluid, the working fluid can be any medium including thermal fluids such as CO2, gases, salts, metals, oils/waxes or air.

Referring to FIG. 1, during daytime operation of the fossil fuel power plant 12 and the solar energy power plant 24, when solar power is abundant, the fossil fuel power plant 12 is operated at a steady state base load operation. However, due to the abundance of solar power, the electricity 18 produced by the fossil fuel power plant 12 and the steam turbine and generator 16 is not needed to be sent to the electric grid power load 22. Instead a portion or all of the thermal energy output 14 by the fossil fuel power plant 12 and the electric energy output 18 by the steam turbine and generator 16 is sent to and stored in the thermal energy storage (TES) mechanism 28.

During early evening hours or nighttime operation of the fossil fuel power plant 12 and the solar energy power plant 24, when solar power is no longer viable, yet power demand is often at its highest, the fossil fuel power plant 12 continues to operate at the steady state base load operation. However, instead of cycling up the operation of the fossil fuel power plant 12 due to the absence of solar power, and burning additional fuel to provide the necessary thermal energy output 14 and electricity 18 to the electric grid power load 22, energy is drawn from or discharged from the thermal energy storage (TES) mechanism 28 to supplement the thermal energy output 14 and electricity 18 produced by the steady state base load operation of the fossil fuel power plant 12 and the steam turbine and generator 16. This significantly reduces the fuel burning of the fossil fuel power plant 12 during the periods of energy discharge from the thermal energy storage (TES) mechanism 28. The reduction of fuel being burnt by maintaining the fossil fuel power plant at the steady state baseline operation during both daytime and nighttime results in lower gas emissions from the fossil fuel power plant 12 (e.g., NOx, SOx) as well as a reduction in the amount of carbon dioxide emitted from the fossil fuel power plant 12, both desirable results when considering climate change initiatives being pursued by many nations.

The system and method for efficiency and revitalization of power plant assets of this disclosure allows existing fossil fuel power plants that are being subject to increased operational wear due to cycling operations or due to lower operational hours as a result of emission initiatives (i.e., a desire for lower gas emissions) to remain as viable and valuable assets for producing power.

The system and method for efficiency and revitalization of power plant assets of this disclosure results in:

1) lower cycling operations on fossil fuel power plant equipment, thus extending lifetime of operation and reducing maintenance costs of fossil fuel power plants.

2) a reduction in gas emissions and CO2 production from fossil fuel power plants thus promoting a sustainable operation of fossil fuel power plants.

3) allowing continued operation of fossil fuel power plant assets that may otherwise fall victim to early retirement as a result of increased maintenance/operating costs or undesirable emissions.

Figure 3A:
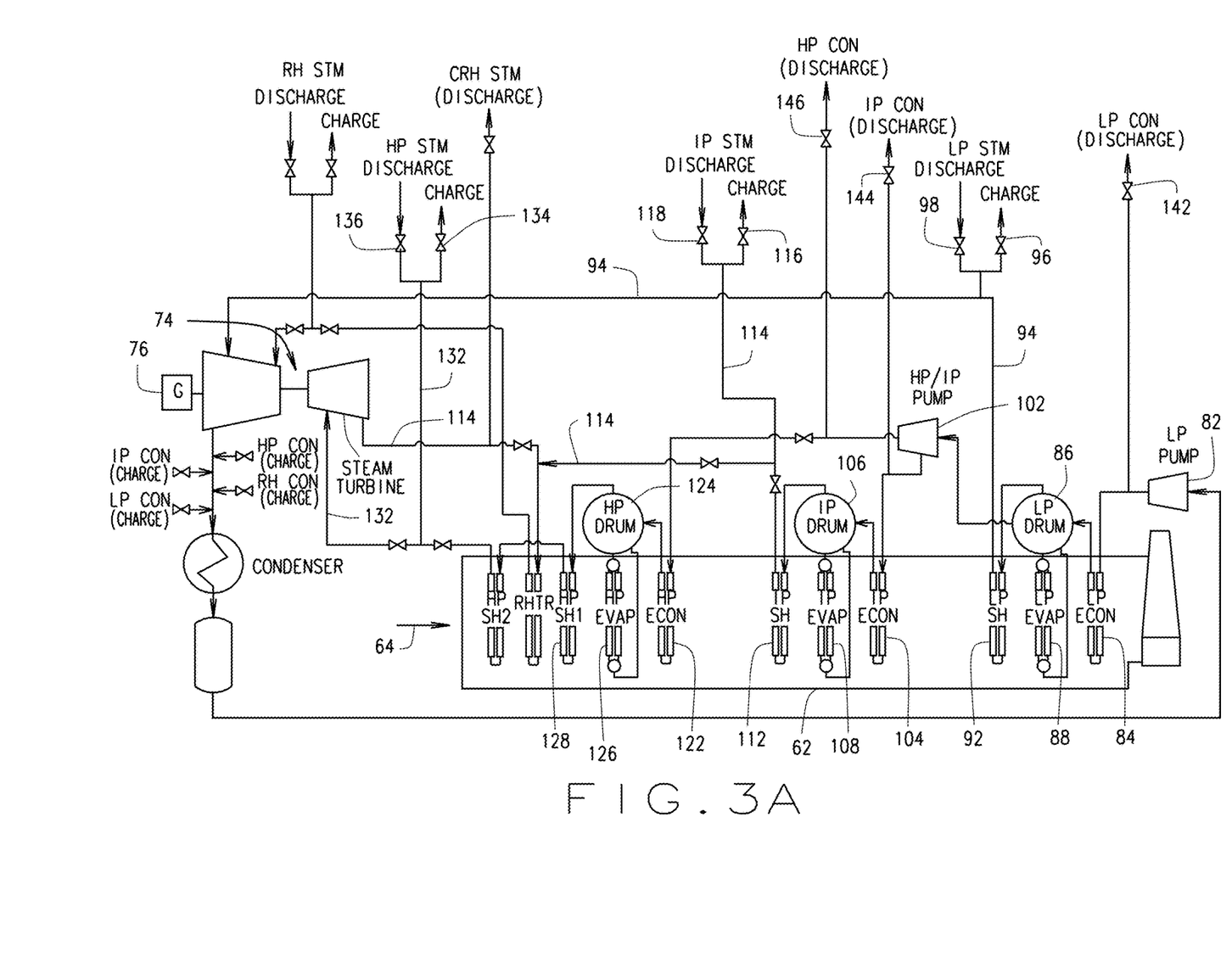
FIG. 3A illustrates an exemplary power generation system and connections to the energy storage system.
Figure 3B:
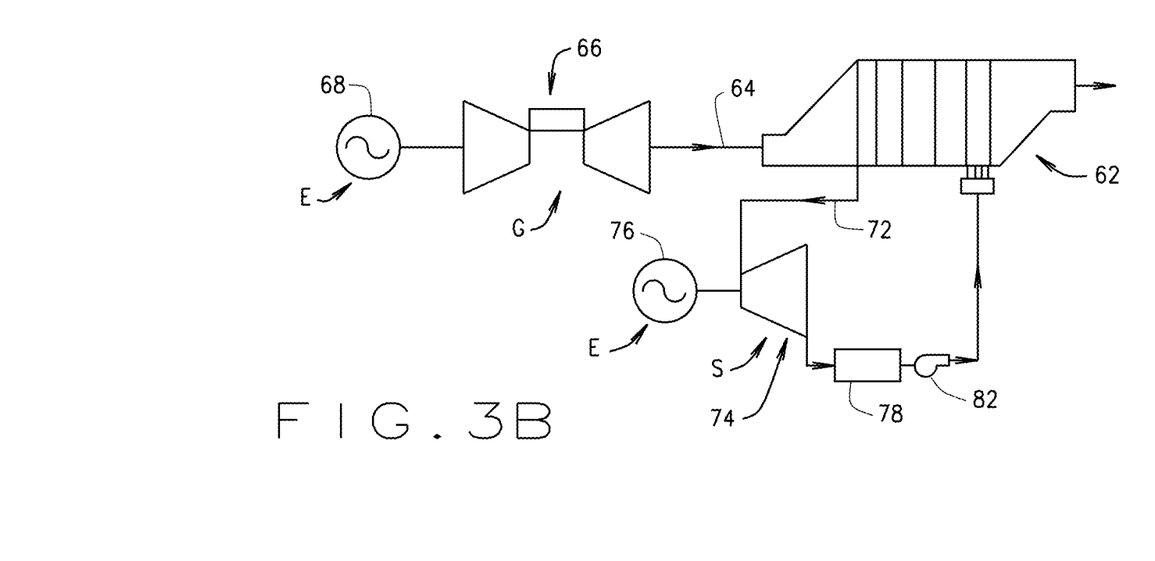
FIG. 3B illustrates an exemplary heat source for the system as a heat recovery steam generator (HRSG).

FIG. 3A is a schematic representation of an example of a power generation system that generates steam, at various pressures, with which the thermal energy storage mechanism 28 may be combined. For example, the power generation system represented in FIG. 3A is a heat recovery steam generator (HRSG). FIG. 3B is a schematic representation of the operative environment of a heat recovery steam generator such as that represented in FIG. 3A.

Figure 3C:
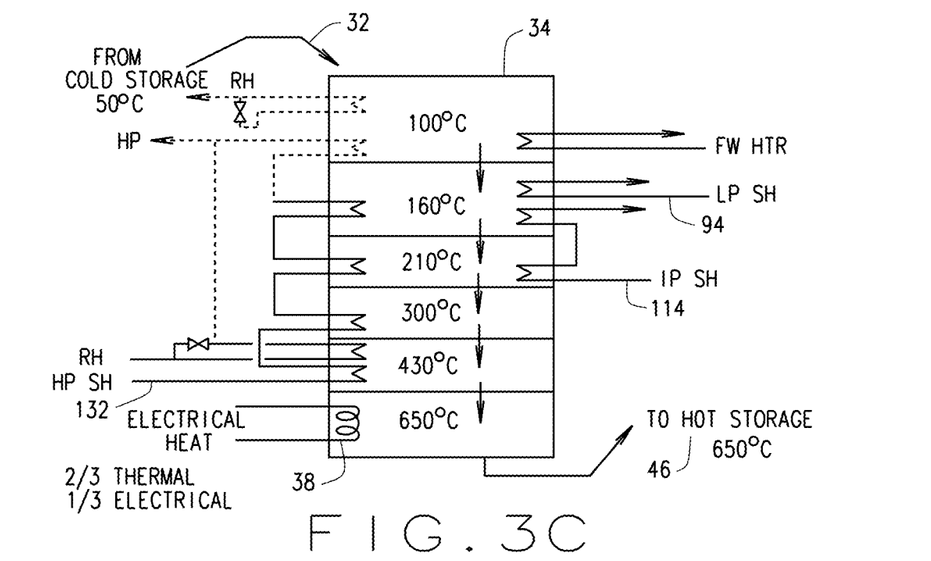
FIG. 3C illustrates a charging cell.
Figure 3D:
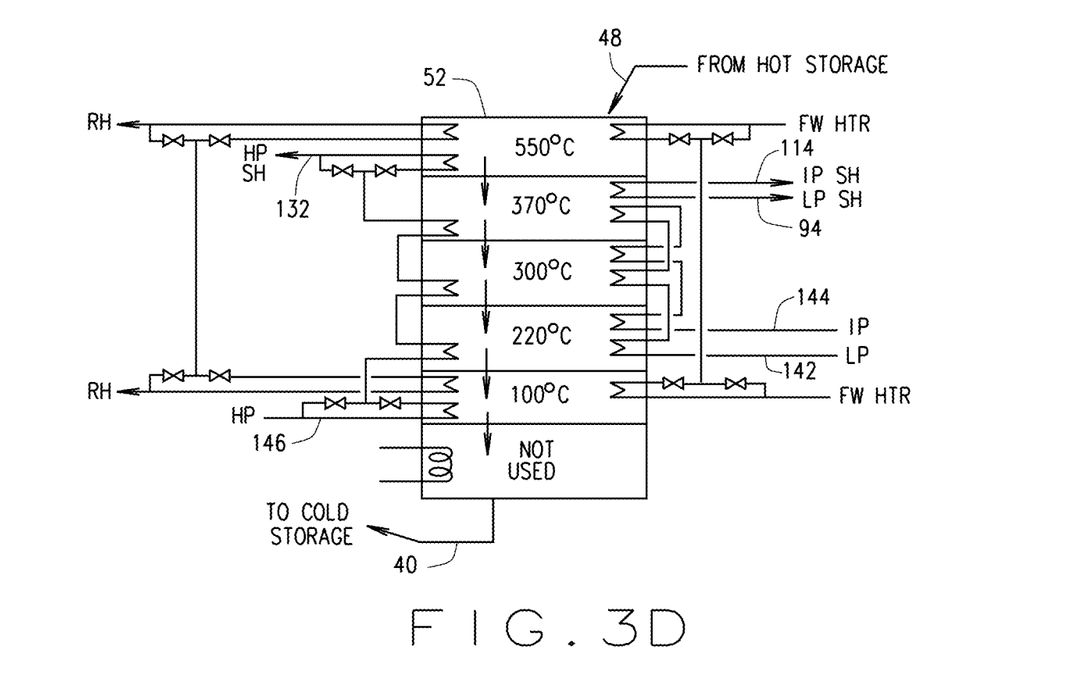
FIG. 3D illustrates a discharging cell.

FIGS. 3C and 3D are schematic representations of the thermal energy storage mechanism 28 operatively communicating with the heat recovery steam generator of FIG. 3A.

Figure 4A:
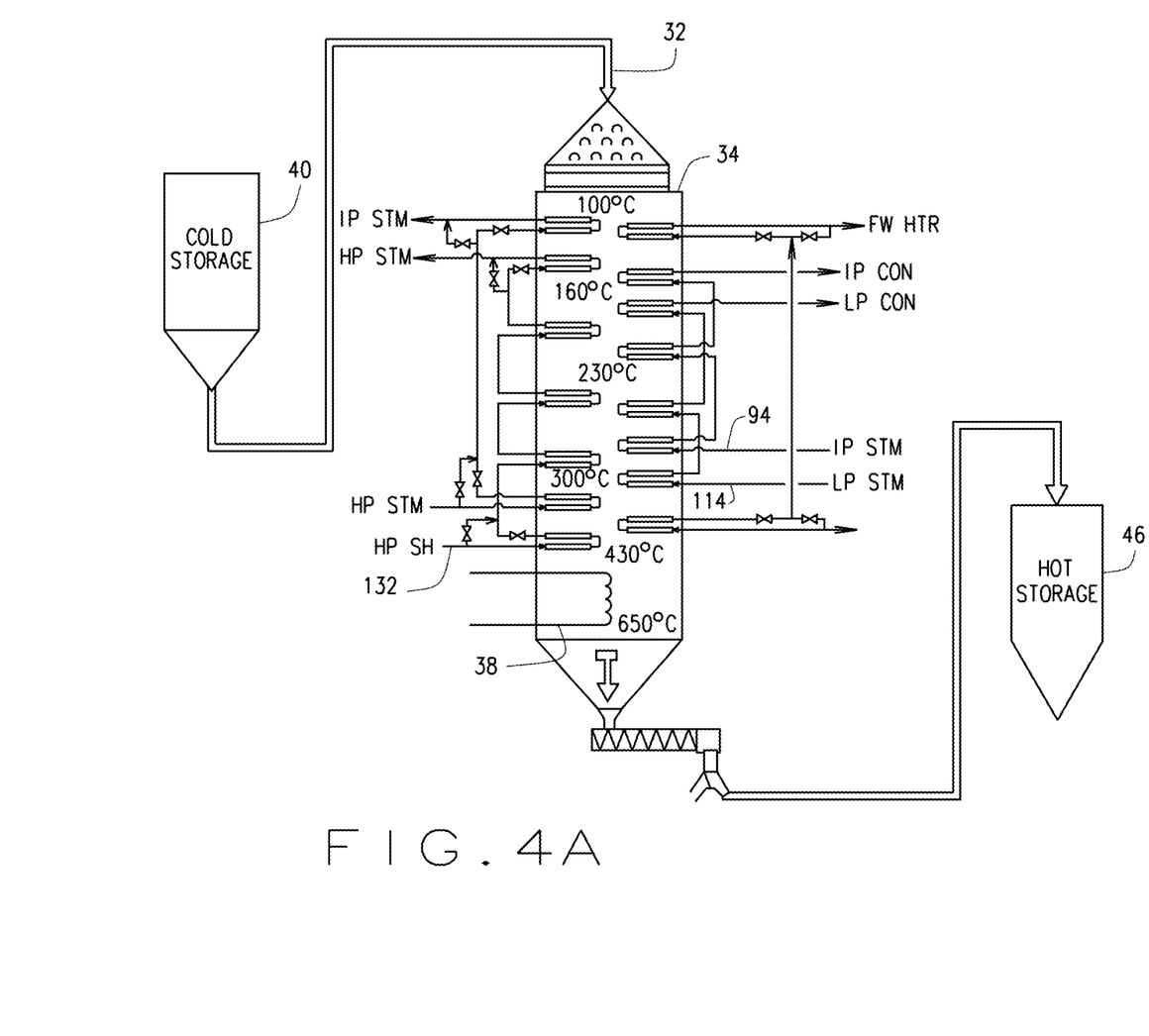
FIG. 4A illustrates a separate embodiment in which a single energy storage cell is being charged.
Figure 4B:
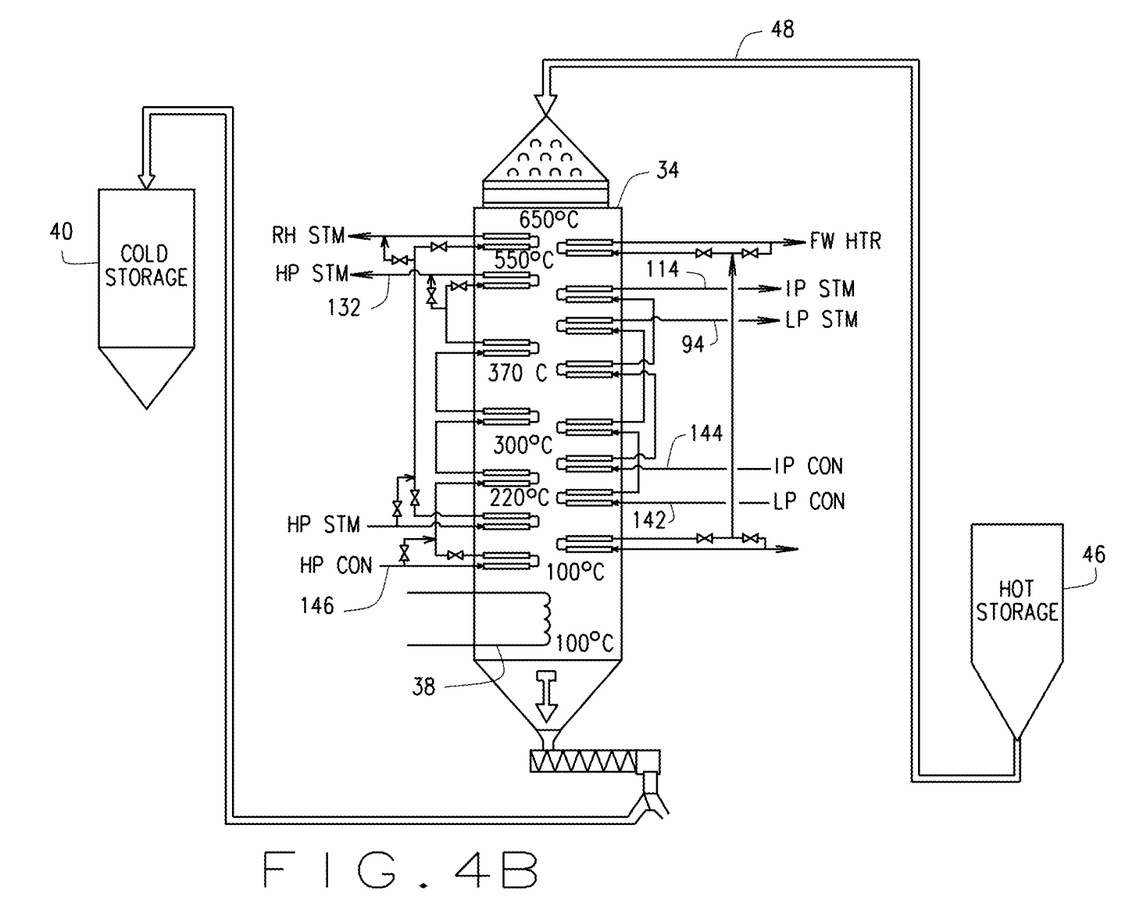
FIG. 4B illustrates the single cell of FIG. 4A being discharged.

FIGS. 4A and 4B are schematic representations of a further embodiment of the thermal energy storage mechanism 28 of this disclosure operatively communicating with the heat recovery steam generator represented in FIG. 3A.

In FIGS. 3A, 3C, 3D, 4A and 4B the acronyms appearing in the FIGS. have the following meanings:

FW HTR=feed water heater (in the HRSG, the feed water leaving the steam turbine as steam condensate).
LP SH=low pressure superheater (in the HRSG).
IP SH=intermediate pressure superheater (in the HRSG).
HP SH=high pressure superheater (in the HRSG).
RH=reheater (for the steam turbine in the HRSG).
HP=high pressure steam (feeding the steam turbine in the HRSG).

The thermal energy storage mechanism (TES) 28 employs a working fluid in the form of a flowable thermal energy storage or heat storage medium such as sand 32 or another equivalent type of medium. The sand 32 employed by the thermal energy storage mechanism (TES) 28 is suitable for retaining heat at elevated temperatures of greater than 250 degrees C., and preferably up to temperatures of 700-800 degrees C.

FIG. 2 is a basic or fundamental representation of the energy storage system of this disclosure. As represented schematically in FIG. 2, the energy storage system or thermal energy storage (TES) mechanism 28 is an energy storage vessel containing two primary components, one of which is a charging cell 34. The charging cell 34 makes use of sand 32 as a heat storage medium with the sand 32 being charged or heated through the use of a hot working fluid such as steam 36. As represented in FIGS. 1 and 2, the steam 36 is tapped or diverted from the thermal energy output 14 of the fossil fuel power plant 12. As an option or in combination with the steam 16, the sand 32 could also be charged or heated by electrical resistance heaters 38 in the charging cell 34. The "cold sand" 32 is taken or conveyed from a cold sand storage device or tank 40 and introduced into the charging cell 34. In the interior of the charging cell 34 the sand 32 is transported over or flows over the heat exchanger heating coils 42 in the cell 34 that are heated by the steam 36 supplied to the cell 34 flowing through the coils 42. The sand 32 moves through the cell 34 by gravity, by a moving belt or other equivalent transport device, or by being blown through the cell 34 by air or gas. As represented schematically in FIG. 2, the vessel of the thermal energy storage mechanism (TES) 28 is comprised of two charging cells 34. In alternate embodiments, the thermal energy storage mechanism (TES) 28 could be comprised of more than (n+1) or fewer than the two charging cells 34 represented in FIG. 2. Each charging cell 34 contains a heat exchanger 42 in the cell 34 in the form of a tubular coil that is in fluid communication with the thermal energy output 14 or steam 36 output of the fossil fuel power plant 12.

Additionally, or optionally, each charging cell 34 has a heat exchanger in the cell 34 in the form of the electrical resistance heater 38 that is in electrical communication with the electric energy output or electricity 18 produced by the steam turbine and generator 16.

As the "cold sand" 32 is introduced into the charging cells 34, the sand flows over the heat exchanger coils 42 and the electrical resistance heaters 38 when present, by gravity, by a moving belt or other equivalent transport device, or by a flow of air or gas moving the sand 32 through the cell 34. In addition to the heat exchanger coils 42 and the electrical resistance heaters 38 represented in FIG. 2, induction heaters or any other common, equivalent heating method may be employed in the cell 34 to impart heat into the sand 32 flowing through the cell 34.

While it is envisioned that the electrical resistance heaters 38 would be employed to impart the higher temperature heat transfer into the sand 32 as the sand 32 flows through the cell 34, it is also possible to have electrical resistance heaters located in any portion of the flow path of the sand 32 either individually, in combination with other resistance heaters, or in parallel with heat exchanger coils 42 in which a working fluid in the form of steam is employed.

After the sand is heated in the cell 34, the hot sand exits the cell 34 and is stored in an insulated storage well or tank or similar hot sand storage device 46 as represented schematically in FIG. 2.

The second primary component of the vessel of the thermal energy storage mechanism 28 is a discharge cell 52. As represented schematically in FIG. 2, the vessel of the thermal energy storage mechanism (TES) 28 is comprised of one discharge cell 52. In alternate embodiments, the thermal energy storage mechanism (TES) 28 could be comprised of more than (m+1) or fewer than the one discharge cell 52 represented in FIG. 2. When it is desired to supplement the thermal energy output 14 of the fossil fuel power plant 12 during nighttime operation of the plant 12 as described earlier, the hot sand 48 stored in the hot sand storage 46 is conveyed, via traditional conveyance techniques such as belt conveyors, buckets, elevators, screws, or pneumatically to the inlet of the discharge cell 52 of the thermal energy storage mechanism (TES) 28 as represented schematically in FIG. 2. The discharge cell 52 contains heat exchanger coils 54 that receive a cooled heat transfer medium such as steam condensate 56 from the steam turbine 16 that flows through the coils 54. In the discharge cell 52 the hot sand 48 is made to flow over the heat exchanger tubular coils 54 by gravity, buy a moving belt conveyor or by transport air or gas so that the heat of the hot sand 48 is transferred into the cooled working heat transfer medium 56 (e.g., water, $CO_2$, heat transfer fluid) flowing inside the coil tubes of the heat exchanger coils 54. This results in the hot sand 48 producing steam 58 in the coils 54. The hot fluid or steam 58 produced by the hot sand 48 flowing over the heat exchanger coils 54 is directed to the steam turbine and generator 16 directly, or in combination with the thermal energy output 14 of the fossil fuel power plant 12 as represented schematically in FIGS. 1 and 2. The steam 58 directed from the discharge cell 52 to the steam turbine and generator 16 supplements the thermal energy output 14 of the fossil fuel power plant 12 in producing electricity 18 supplied to the electric grid power load 22.

While the above example makes use of sand as the heat retention medium, it should be understood that other equivalent types of heat storage medium could be employed.

The heat exchangers 42, 54 used for conveying the working fluid in the charge 34 and discharge 52 cells may be typical heat transfer tube fields consisting of round tubes in parallel or series arrangements with distribution and collection headers. In another example, the heat exchangers 42, 54 could have heat transfer tubes enclosed in a shroud to minimize operational wear or pressure loads on the tubes. Furthermore, the heat exchangers 42, 54 could also be a plate exchanger type with the sand or other heat storage medium flowing between every other stacked sheet with the heat transfer fluid flowing on the other side of the sheets. In practice, the heat exchangers 42, 54 could comprise the shapes and forms of heat exchangers typically employed in general heat transfer practice.

It should be noted that the only significant structural difference between the charging cell 34 and the discharge cell 52 described above is the presence of an electrical resistance heater 38 in the charging cell 34. As set for above, the electrical resistance heater 38 is considered to be an option in the charging cell 32. The electrical resistance heater 38 could be removed from the charging cell 34 and then the charging cell 34 and the discharge cell 52 would have substantially the same constructions. Thus, the charging cell 34 with the electrical resistance heater 38 removed could be employed to perform both functions of charging or imparting heat to the cold sand 32 and discharging or withdrawing heat from the hot sand 48.

A more detailed schematic representation of an operative environment of the thermal energy storage mechanism 28 of this disclosure is represented in FIGS. 3A-3D, 4A and 4B. FIGS. 3A and 4A represent the charging function of a charging cell and FIGS. 3B and 4B represent the discharge function of a discharge cell. The only difference between these FIGS. is that FIGS. 4A and 4B show the same cell performing the charge and discharge functions.

FIG. 3A is a schematic representation of the internal components of a heat recovery steam generator 62 such as that represented schematically in FIG. 3B. In FIG. 3B the heat recovery steam generator 62 is shown receiving hot exhaust gas 64 from fuel combustion that occurs in a gas turbine 66. The combustion in the gas turbine 66 drives an electric generator 68 which produces output electricity. The hot exhaust gas 64 from the turbine 66 supplied to the heat recovery steam generator 62 produces super-heated steam 72. The steam 72 is output by the heat recovery steam generator 62 and supplied to a further steam turbine 74. The steam 72 drives the steam turbine 74 which in turn drives a further electric generator 76. The electric generator 76 produces output electricity. The steam that passes through the steam turbine 74 is condensed in a condenser 78 to water, and the water is pumped buy a pump 82 as feed water back to the heat recovery steam generator 62.

FIG. 3A represents the water being pumped by the pump 82 to the heat recovery steam generator 62. The water entering the heat recovery steam generator 62 passes through a low pressure economizer 84, a low pressure drum 86, a low pressure evaporator 88 and a low pressure superheater 92. This produces low pressure steam 94 that is output from the low pressure superheater 92. The low pressure steam 94 is communicated with a low pressure charge valve 96 and a low pressure discharge valve 98 before being directed to the steam turbine 74.

Water from the low pressure drum 86 that has not been converted to steam is directed to an intermediate pressure/high pressure pump 102. The water output from the intermediate pressure/high pressure pump 102 passes through an intermediate pressure economizer 104, an intermediate pressure drum 106, an intermediate pressure evaporator 108 and an intermediate pressure superheater 112. This produces intermediate pressure steam 114 that is output from the intermediate pressure superheater 112. The intermediate pressure steam 114 is communicated with an intermediate pressure charge valve 116 and an intermediate pressure discharge valve 118 before being directed to the steam turbine 74.

The water output from the intermediate pressure/high pressure pump 102 also passes through a high pressure economizer 122, a high pressure drum 124, a high pressure evaporator 126 and a high pressure superheater 128. This produces high pressure steam 132 that is output from the high pressure superheater 128. The high pressure steam 132 is communicated with a high pressure charge valve 134 and a high pressure discharge valve 136 before being directed to the steam turbine 74.

The charge functions of the thermal energy storage mechanisms 28 of FIGS. 3C and 4A are basically the same. Therefore, only the charge functioning of the thermal energy storage mechanism 28 of FIG. 3C is describe herein, with it understood the charge functioning of the thermal energy storage mechanism 28 of FIG. 4A is the same.

In the charge functioning of the thermal energy storage mechanism 28 represented in FIG. 3C in combination with the heat recovery steam generator 62 represented in FIG. 3A, the sand 32 heat storage medium is first introduced to and inlet opening of the charging cell 34 at the top of the charging cell as represented in FIG. 3C. The sand 32 introduced into the top of the charging cell 34 falls by gravity through the charging cell and is heated, as will be explained. In other embodiments, the sand 32 or other heat storage medium could be introduced at the bottom of the charging cell 34 and moved upward through the charging cell. Furthermore, the charging cell 34 could be constructed in a manner where it is oriented vertically as opposed to the horizontal orientation represented in FIG. 3C and the sand or other heat storage medium could be moved horizontally through the charging cell.

In the heat recovery steam generator 62 during charge functioning, the low pressure charge valve 96, the intermediate pressure charge valve 116 and the high pressure charge valve 134 are all open. This supplies low pressure steam 94, intermediate pressure steam 114 and high pressure steam 132 to the charging cell 34 as represented in FIG. 3C. The steam supplied to the charging cell 34 heats the heat exchangers supplied with the steam. As the cold sand 32 falls through the charging cell 34 as represented in FUG. 3C, the sand, which is typically supplied to the charging cell 34 at a temperature of 50 degrees C., is first heated to a temperature at about 100 degrees C. As the sand falls through the heat exchangers supplied with the low pressure steam 94, the sand is heated to about 160 degrees C. As the sand continues to fall through the charging cell 34 and passes through the heat exchangers supplied with the intermediate pressure steam 114, the sand is heated through about 110 degrees C. to 300 degrees C. As the sand continues to fall through the heat exchangers supplied with the high pressure steam 132, the sand is heated to about 430 degrees C. If the electrical resistance heat exchangers 38 are employed in the charging cell 34, operation of the electrical resistance heat exchangers 38 would raise the sand to a temperature of about 650 degrees C. The fully heated sand then exits the charging cell 34 and is conveyed to the hot storage tank 46.

The discharge functions of the thermal energy storage mechanisms 28 of FIGS. 3D and 4B are basically the same. Therefore, only the discharge functioning of the thermal energy storage mechanism 28 of FIG. 3D is describe herein, with it understood the charge functioning of the thermal energy storage mechanism 28 of FIG. 4B is the same.

In the discharging functioning of the energy storage mechanism 28 represented in FIG. 3D in combination with the heat recovery steam generator 62 represented in FIG. 3A, the hot sand 48 is introduced to the inlet opening at the top of the discharging discharge cell 52 has represented in FIG. 3D, the hot sand 48 falls through the discharge cell 52 and heats the fluid or condensate flowing through the heat exchanger coils of the discharge cell 52. The low pressure charge valve 96, the intermediate pressure charge valve 116 and the high pressure charge valve 134 of the heat recovery steam generator 62 are all closed. The low pressure discharge valve 98, the intermediate pressure discharge valve when 18 and the high pressure discharge valve 136 are all opened.

Additionally, a low pressure condensate discharge valve 142, an intermediate pressure condensate discharge valve 144 and a high pressure condensate discharge valve 146 are all opened. This supplies low pressure condensate 142, intermediate pressure condensate 144 and high pressure condensate 146 to the discharge cell 52 as represented in FIG. 3D. The hot sand 48 is typically supplied to the discharge cell 52 at a temperature of about 550 degrees C. As the hot sand 48 falls through the discharge cell 52, the sand heats the heat exchangers supplied with the condensate to thereby heat the condensate. That heated condensate supplied to the heat exchangers by the low pressure condensate discharge valve 142, the intermediate pressure condensate discharge valve 144 and the high pressure condensate discharge valve 146, heats the condensate to produce steam. As represented in FIG. 3D, the high pressure condensate 146 flows upward through the hot sand 48 a majority of the length of the cell 52 as the sand is cooled from about 550 degrees C. to about 100 degrees C., and the condensate is heated to steam. The low pressure condensate 142 and the intermediate pressure condensate 144 also flow upward through the hot sand 48 as the sand is cooled and the condensate is heated to stream. The steam created is then supplied from the discharge cell 52 to the low pressure discharge valve 98, the intermediate pressure discharge valve 118 and the high pressure discharge valve 136 and returned to the heat recovery steam generator 62.

FIGS. 4A and 4B are schematic representations of a cell 34 having a structure that enables the cell 34 to perform both functions of imparting heat to the cold sand and withdrawing heat from the hot sand. As set forth earlier, the cell 34 of FIGS. 4A and 4B functions in the same manner as the charging cell 34 of FIG. 3C and the discharge cell 52 of FIG. 3D described earlier.

It should be noted that although electric resistance heaters 38 are represented in the cell 34 in FIGS. 4A and 4B, if the electric resistance heaters 38 are not needed to heat the hot sand they could be eliminated from the cell 34.

Figure 5A:
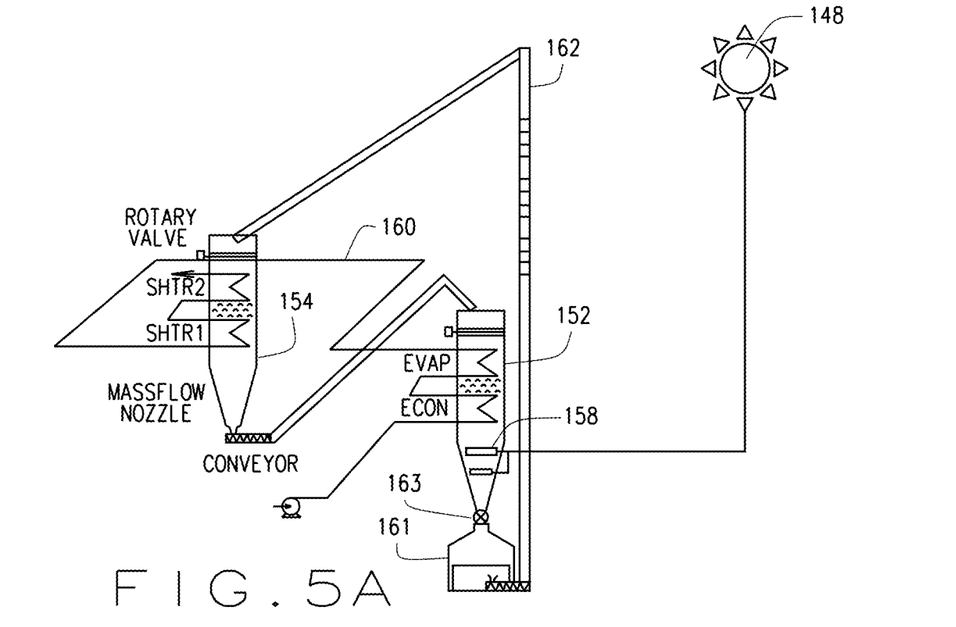
FIG. 5A illustrates an alternative embodiment with separate charging and discharging cells, but which does not include distinct storage tanks and embodies using preferably a renewable energy source for use in creating electrical heating for storing energy in the heat storage media. Heating can also be in the form of waste heat, steam or other thermal fluids.

FIG. 5A is a schematic representation of a further embodiment of thermal energy storage in which renewable energy is used to create heat which is transferred into the heat storage media. In this embodiment, a renewable energy source 148 (e.g., solar) is the preferred means used for heating the storage media. Additionally, the renewable energy can be introduced into the system in either illustrated cell 152, 154. The renewable energy is used to create heat at temperatures ranging between 100 degrees C. and 1000 degrees C. via electrical resistance heaters 158 which can be located throughout the various cells. For example, in FIG. 5A, the electrical resistance heaters 158 are located at an end of the heat transfer process in a first cell 152 that is connected in series with a second cell 154. The heat storage media is supplied to the top of the first cell 152 and is allowed to immediately pass over a heating surface of a heat exchanger in the cell 152, such as the illustrated evaporator (EVAP) and economizer (ECON). The heat storage media can then be transferred such as mechanically, pneumatically or by gravity to another, second cell 154 located in series with the first cell 152 as represented in FIG. 5A. The working fluid such as steam/water passing through the first cell 152 can be communicated with the second cell 154 through piping connections 160, or separate working fluids such as steam/water can be communicated separately to and pass through each cell 152, 154.

The hot storage media can then be held in the integral media storage tank or hopper 161 located at the bottom of the cell 152 for immediate conveyance by a conveyor device 162 to the top of the cell 154 after being heated, or for later conveyance back to the top of the cell 164. The bottom of the cell 152 and top of the tank or hopper 161 can be secured and held together to be integral or unitary as by bolts and nuts, screws or welding. Conveyor device 162 can be a mechanical or pneumatic device 170, or other equivalent devices known in the industry. The hot storage media can be regulated by a valve or other means 163 shown near the bottom of cell 12, that controls the rate at which the hot storage media enters the hopper or tank 161.

It should be understood that multiple cells could also be located in parallel, for example multiple cells such as the cell 154 being placed in parallel with the heat storage media being distributed to each of the parallel cells 154.

Figure 5B:
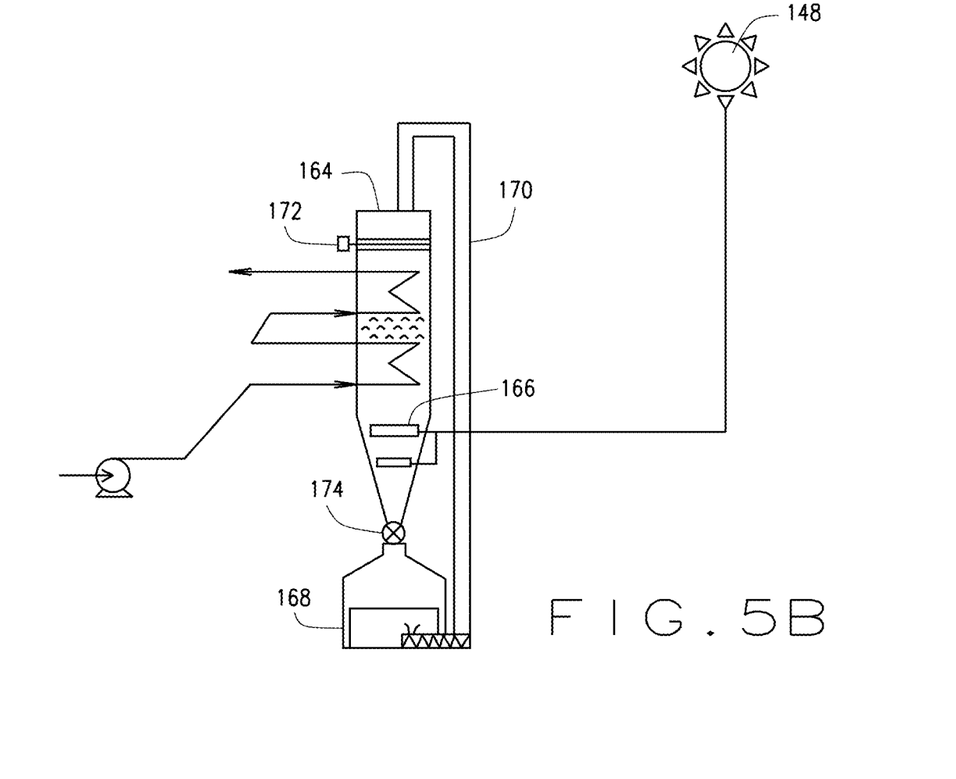
FIG. 5B illustrates a further alternative embodiment in which a single energy storage cell is capable of both charging and discharging and in which distinct storage tanks are not used and embodies using preferably a renewable energy source for use in creating resistance heating for storing energy in the heat storage media. Heating can also be in the form of waste heat, steam or other thermal fluids.

FIG. 5B is a schematic representation of a still further embodiment of a cell 164 that functions as both a charging cell and a discharging cell. Preferably a renewable energy source 148 (e.g., solar) is used to power electrical resistance heaters 166 to create heat at temperatures between 100 degrees C. and 1000 degrees C. or higher. The heat storage media is supplied to the top of the cell 164 and is allowed to fall (pass) through the cell and the electrical resistance heaters 166, effectively recovering and storing the renewable energy in the heat storage media via contact with the resistance heater. The hot storage media can then be held in the integral media storage tank 168 located at the bottom of the cell 164 for later conveyance back to the top of the cell 164 by a conveyor device 170, or for immediate conveyance to the top of the cell 164 after being heated. The storage media is conveyed to the top of the cell 164 such as through mechanical or pneumatic devices 170, or other equivalent device known in the industry. The hot storage media, now located at the top of the cell 164, is regulated by a valve or other means 172 that controls the rate at which the hot storage media is allowed to enter the cell 164. Similarly or alternatively, a valve 174 can be located at the bottom of the cell 164 through which the flow rate of the heat storage media can be regulated. Heat exchanging coils can be located at any location within the cell 164 to facilitate energy recovery and storage.

In view of the above, it will be seen that there are several objects and advantages of the present disclosure.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An energy storage system for controllably storing energy produced by a power plant and controllably releasing energy back to the power plant, the energy storage system comprising:
   an energy storage vessel, the energy storage vessel comprising:
   a cold medium storage device in the energy storage vessel;
   a hot medium storage device in the energy storage vessel;
   a charging cell in the vessel, the charging cell having an interior, the cold medium storage device being connected in communication with the interior of the charging cell for conveyance of heat storage medium from the cold heat medium storage device to the interior of the charging cell, the interior of the charging cell being adapted and configured to receive the heat storage medium in the interior of the charging cell, to flow the heat storage medium through the interior of the charging cell, and output the heat storage medium from the interior of the charging cell to the hot medium storage device connected in communication with the interior of the charging cell; and
   at least one heat exchanger positioned within the interior of the charging cell where the heat storage medium flowing through the interior of the charging cell flows over the at least one heat exchanger, the at least one heat exchanger being connected in fluid communication with energy produced by the power plant in a working fluid received from the power plant, the at least one heat exchanger conducting a flow of the working fluid in the at least one heat exchanger through the interior of the charging cell, the at least one heat exchanger being adapted and configured to exchange heat between the working fluid received from power plant and the heat storage medium in the interior of the charging cell using the working fluid circulating between the energy produced by the power plant and the at least one heat exchanger;

the energy storage vessel further comprising:

a discharging cell in the vessel, the discharging cell having an interior, the hot medium storage device being connected in communication with the interior of the discharging cell for conveyance of heat storage medium from the hot medium storage device to the interior of the discharging cell; the interior of the discharging cell being adapted and configured to receive the heat storage medium in the interior of the discharging cell, to flow the heat storage medium through the interior of the discharging cell, and output the heat storage medium from the interior of the discharging cell to the cold medium storage device connected in communication with the interior of the discharging cell; and at least one heat exchanger positioned within the interior of the discharging cell where the heat storage medium transported through the interior of the discharging cell flows over the at least one heat exchanger, the at least one heat exchanger being connected in fluid communication with energy produced by the power plant in a working fluid received from the power plant, the at least one heat exchanger conducting a flow of the working fluid through the interior of the discharging cell in the at least one heat exchanger, the at least one heat exchanger being adapted and configured to exchange heat between the power plant and the heat storage medium in the interior of the discharging cell using the working fluid circulating between the power plant and the at least one heat exchanger;

wherein the energy storage system is adapted and configured to charge heat into the energy storage vessel by imparting heat to the heat storage medium using the working fluid and the heat exchanger of the charging cell, and wherein the energy storage system is adapted and configured to discharge heat from the energy storage vessel by imparting heat from the heat storage medium to the working fluid and circulating the working fluid from the heat exchanger of the discharging cell to the power plant and using the heat imparted to the working fluid to supply heat to the power plant.

2. The energy storage system of claim 1, wherein the energy storage system is adapted and configured to selectively charge and discharge the energy storage vessel to moderate output from the power plant in response to varying demand on the power plant.

3. The energy storage system of claim 1, wherein the charging cell and the discharging cell are adapted and configured to be capable of charging and discharging simultaneously with each other.

4. The energy storage system of claim 1, wherein the energy storage vessel comprises a plurality of charging cells.

5. The energy storage system of claim 1, further comprising the cold medium storage device being adapted and configured to receive heat storage medium from which heat has been removed during discharge of the discharging cell, and the hot medium storage device being adapted and configured to receive heat storage medium to which heat has been added during charging of the charging cell.

6. The energy storage system of claim 1, wherein the at least one heat exchanger within the interior of the charging cell comprises a plurality of heat exchangers, each heat exchanger of the plurality of heat exchangers is positioned within the interior of the charging cell and is adapted and configured to transfer heat between the working fluid in the heat exchanger and the heat storage medium within the interior of the charging cell.

7. The energy storage system of claim 6, wherein each heat exchanger of the plurality of heat exchangers within the interior of the charging cell is adapted and configured to transfer heat between the power plant and the heat storage medium at different temperatures.

8. The energy storage system of claim 1, wherein the heat storage medium is one or more of sand, salt, gravel, metal particle or silicon.

9. The energy storage system of claim 1, wherein the working fluid is one or more of water or carbon dioxide.

10. The energy storage system of claim 1, wherein charging cell comprises at least one heating element adapted and configured to heat the heat storage medium.

11. The energy storage system of claim 10, wherein the at least one heating element is an electrical heating element.

12. The energy storage system of claim 1 wherein the power plant is a fuel burning power plant.

13. The energy storage system of claim 1, wherein the energy storage system further comprises the cold medium storage device being a cold storage tank, the cold storage tank adapted and configured to receive heat storage medium from which heat has been removed during discharge of the discharging cell, and the hot medium storage device being a hot storage tank adapted and configured to receive heat storage medium to which heat has been added during charging of the charging cell.

14. The energy storage system of claim 13 wherein the discharging cell comprises a discharge outlet, wherein the cold storage tank comprises an inlet, and wherein the said discharging cell discharge outlet is configured to be directly connected to the cold storage tank inlet with a conduit flow path formed between the cold storage tank and the discharging cell for flow of heat storage medium, the discharging cell and cold storage tank being integral with each other; and a valve positioned in the conduit flow path and configured and adapted to control flow of heat storage medium from the discharging cell to the cold storage tank.

15. The energy storage system of claim 14, further comprising material handling components, the material handling components being adapted and configured, during charging cell charging, to selectively move heat storage medium from the hot storage tank to the top of the vessel, and the material handling components being adapted and configured, during discharging cell discharging, to move heat storage medium from the cold storage tank to be received by the charging cell.

16. The energy storage system of claim 13, wherein the charging cell comprises at least one heating element adapted and configured to heat the heat storage medium; and the at least one heating element is electrical and an electrical connection with the renewable energy source.

17. An energy storage system for controllably storing energy produced by a heat source and controllably releasing energy back to the heat source, the energy storage system comprising:

an energy storage vessel, the energy storage vessel comprising:

a charging cell adapted and configured to receive a heat storage medium, allow the heat storage medium to pass through the charging cell, and output the heat storage medium from the charging cell;

at least one heat exchanger positioned within the charging cell and adapted and configured to exchange heat between the heat source and the heat storage medium using a working fluid capable of circulating between the heat source and the at least one heat exchanger;

the at least one heat exchanger within the charging cell comprises a plurality of heat exchangers, each heat exchanger of the plurality of heat exchangers is positioned within the charging cell and adapted and configured to transfer heat between the heat source and the heat storage medium at different points within a thermal cycle provided by the heat source; and a feed water heater in fluid flow connection with one or more of the plurality of heat exchangers and wherein the plurality of heat exchangers comprises a first heat exchanger adapted and configured to transfer heat between the heat storage medium and the working fluid upstream of the feedwater heater.

18. The energy storage system of claim 17, wherein the plurality of heat exchangers comprises a second heat exchanger adapted and configured to transfer heat between the heat storage medium and the working fluid downstream of a low pressure steam superheater or upstream of a low pressure steam condenser.

19. The energy storage system of claim 18, wherein the plurality of heat exchangers includes a third heat exchanger adapted and configured to transfer heat between the heat storage medium and the working fluid downstream of an intermediate pressure steam superheater and upstream of an intermediate pressure steam condenser or downstream of an intermediate pressure steam condenser and downstream of an intermediate pressure steam drum.

20. The energy storage system of claim 19, wherein the plurality of heat exchangers includes a fourth heat exchanger adapted and configured to transfer heat between the heat storage medium and the working fluid at a position located at one of downstream of a steam reheater and upstream of a steam reheater condenser, or downstream of a cold reheat steam source and upstream of a steam reheater.

21. The energy storage system of claim 20, wherein the plurality of heat exchangers includes a fifth heat exchanger adapted and configured to transfer heat between the heat storage medium and the working fluid downstream of a high pressure steam superheater and upstream of a high pressure steam condenser or downstream of a high pressure steam condenser and upstream of a high pressure steam superheater.

22. An energy storage system for controllably storing energy produced by a power plant and controllably releasing energy back to the power plant, the energy storage system comprising:

a heat storage medium tank capable of storing heat storage medium;

a cell, the cell being configured to be capable of being a heat charging cell and a heat discharging cell, the cell having an interior, the cell having an input at one end of the interior of the cell and the cell having an output at an opposite end of the interior of the cell, the heat storage medium tank being connected in communication with the input of the cell and the interior of the cell for conveyance of heat storage medium from the heat storage medium tank to the interior of the cell, the interior of the cell being adapted and configured to receive heat storage medium in the interior of the cell, to allow flow of heat storage medium through the interior of the cell, and output the heat storage medium from the interior of the cell to the heat storage medium tank connected in communication with the output of the cell;

at least one heat exchanger positioned within the interior of the cell where the heat storage medium flowing through the interior of the cell flows over the at least one heat exchanger, the at least one heat exchanger being capable of being alternatively connected in fluid communication with heated working fluid and cooled working fluid received from the power plant, the at least one heat exchanger being configured to conduct a flow of the working fluid in the at least one heat exchanger through the interior of the cell, the at least one heat exchanger being adapted and configured to alternatively transfer heat from the working fluid received from the power plant to the heat storage medium in the interior of the cell and transfer heat from the heat storage medium in the interior of the cell to the working fluid received from the power plant to heat the working fluid in the at least one heat exchanger;

wherein, the energy storage system is adapted and configured to charge heat into the energy storage system by imparting heat to the heat storage medium using the working fluid and the at least one heat exchanger in the cell, and wherein, the energy storage system is adapted and configured to discharge heat from the energy storage system by imparting heat from the heat storage medium to the working fluid and circulating the working fluid from the heat exchanger in the cell to the power plant and using the heat imparted to the working fluid to supply heat to the power plant.

23. The energy storage system of claim 22, wherein the energy storage system is adapted and configured to selectively charge and discharge the cell to moderate output from the power plant in response to varying demand on the power plant.

24. The energy storage system of claim 22, wherein a conveyor device is connected in communication between the heat storage medium tank and the input of the cell.

25. The energy storage system of claim 22, wherein at least one solar powered electrical resistance heater is positioned in the interior of the cell.

26. The energy storage system of claim 22, wherein the heat storage medium tank is adapted and configured to receive heat storage medium from which heat has been removed when the cell functions as a heat discharging cell and the heat storage medium tank is adapted and configured to receive heat storage medium to which heat has been added when the cell functions as a heat charging cell.

27. The energy storage system of claim 22, wherein the at least one heat exchanger positioned within the interior of the cell comprises a plurality of heat exchangers, each heat exchanger of the plurality of heat exchangers is positioned within the interior of the cell and is adapted and configured to transfer heat between the working fluid in the heat exchanger and the heat storage medium within the interior of the cell.

28. The energy storage system of claim 27, wherein each heat exchanger of the plurality of heat exchangers within the interior of the cell is adapted and configured to transfer heat between the power plant and the heat storage medium at different temperatures.

29. The energy storage system of claim 22, wherein the heat storage medium is one or more of sand, salt, gravel, metal particles or silicon.

30. The energy storage system of claim 22, wherein the working fluid is one or more of water or carbon dioxide.

31. The energy storage system of claim 22, wherein the cell comprises at least one heating element adapted and configured to heat the heat storage medium.

32. The energy storage system of claim 31, wherein the at least one heating element is an electrical heating element.

33. The energy storage system of claim 22, wherein the power plant is a fuel burning power plant.

34. The energy storage system of claim 22, wherein the energy storage system further comprises the heat storage medium tank being adapted and configured to receive heat storage medium from which heat has been removed during discharge of the cell, and the heat storage medium tank being adapted and configured to receive heat storage medium to which heat has been added during charging of the cell.

* * * * *